(12) United States Patent
Beutel et al.

(10) Patent No.: US 6,669,463 B2
(45) Date of Patent: Dec. 30, 2003

(54) QUICK START LARGE DYNAMIC RANGE COMBUSTOR CONFIGURATION

(75) Inventors: Matthew J. Beutel, Webster, NY (US); William H. Pettit, Rochester, NY (US); Steven G. Goebel, Victor, NY (US)

(73) Assignee: General Motors Corporation, Detroit, MI (US)

( * ) Notice: Subject to any disclaimer, the term of this patent is extended or adjusted under 35 U.S.C. 154(b) by 30 days.

(21) Appl. No.: 10/044,338

(22) Filed: Jan. 11, 2002

(65) Prior Publication Data

US 2003/0134239 A1 Jul. 17, 2003

(51) Int. Cl.[7] .................................................. F23D 3/40
(52) U.S. Cl. .......................... 431/7; 431/11; 431/170; 431/207; 431/243
(58) Field of Search .................... 431/5, 7, 11, 190, 431/207, 243, 350–354; 429/12, 13, 22, 26

(56) References Cited

U.S. PATENT DOCUMENTS

| | | | |
|---|---|---|---|
| 4,650,727 A | | 3/1987 | Vanderborgh et al. |
| 5,431,017 A | * | 7/1995 | Kobayashi et al. ............ 431/7 |
| 6,077,620 A | | 6/2000 | Pettit |
| 6,083,425 A | | 7/2000 | Clawson et al. |
| 6,123,913 A | | 9/2000 | Clawson et al. |
| 6,126,908 A | | 10/2000 | Clawson et al. |
| 6,306,531 B1 | * | 10/2001 | Clingerman et al. .......... 429/26 |

\* cited by examiner

*Primary Examiner*—James C. Yeung
(74) *Attorney, Agent, or Firm*—Karl F. Barr, Jr.; Cary W. Brooks; Linda M. Deschere

(57) ABSTRACT

The present invention provides a combustor for a fuel processor which integrates a burner and a catalyst. The burner is utilized to quickly heat the catalyst to a light-off temperature to prepare it for normal operation. The heated catalyst is then used to react anode exhaust with air or cathode exhaust under normal operation.

20 Claims, 3 Drawing Sheets

QUICK START LARGE DYNAMIC RANGE COMBUSTOR CONFIGURATION

FIELD OF THE INVENTION

The present invention relates generally to a fuel cell system having a combustor for heating a fuel reformer. In particular, the present invention relates to a catalytic combustor having a flame combustor for pre-heating the catalyst during start-up of the fuel cell system.

BACKGROUND OF THE INVENTION $H_2$—$O_2$ (air) fuel cells are well known in the art and have been proposed as a power source for many applications. There are several different types of $H_2$—$O_2$ fuel cells including acid-type, alkaline-type, molten-carbonate-type and solid-oxide type. So-called PEM (proton exchange membrane) fuel cells [a.k.a. SPE (solid polymer electrolyte) fuel cells] are of the acid-type, potentially have high power and low weight, and accordingly are desirable for mobile applications (e.g., electric vehicles). PEM fuel cells are well known in the art, and include a "membrane electrode assembly" (a.k.a. MEA) comprising a thin, proton transmissive, solid polymer membrane-electrolyte having an anode on one of its faces and a cathode on the opposite face. In PEM fuel cells hydrogen is the anode reactant (i.e., fuel) and oxygen is the cathode reactant (i.e., oxidant). The oxygen can be in the form of pure $O_2$ or air ($O_2/N_2$).

For vehicular applications, it is desirable to use a liquid fuel such as a low molecular weight alcohol (e.g., methanol or ethanol), or hydrocarbons (e.g., gasoline) as the fuel for the vehicle owing to the case of onboard storage of liquid fuels and the existence of a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide according to the reaction:

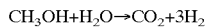

$$CH_3OH + H_2O \rightarrow CO_2 + 3H_2$$

The reforming reaction is an endothermic reaction that requires external heat for the reaction to occur. The heat required to produce enough hydrogen varies with the demand put on the fuel cell system at any given point in time. Accordingly, the heating means for the reformer must be capable of operating over a wide range of heat outputs. Heating the reformers with heat generated externally from either a flame combustor or a catalytic combustor is known. The present invention relates to an improved catalytic combustor, and the integration thereof with a fuel cell system so as to fuel the combustor with unreformed liquid fuel, hydrogen-containing anode exhaust gas, or both at different times in its operating cycle depending on the electrical demand placed on the system.

The acceptance of fuel cells by vehicle owners will be governed, in part, by their experience with vehicles powered by an internal combustion engine. Consumers have grown accustomed to the relatively quick starting times of engines. Thus, one challenge facing fuel cell designers is to provide a similar relatively quick start up time for fuel cells. This is made difficult by the relatively high operating temperature of some of the components of fuel cells such as the fuel reformer and the primary reactor of the fuel processor.

In order to reduce the start-up time required to heat the catalyst to its light-off temperature (between 150° C. to 250° C.), it is known to equip the catalytic combustor with an electrically-powered heating element. Unfortunately, such electrically heated catalyst systems require a relatively large electric power input (typically 2–4 kilowatts at 12–24 volts and 160–240 amps) at start-up and can potentially damage the catalyst bed (due to thermal shock) if not properly controlled. Thus, the expense associated with the system componentry (i.e., associated batteries and high current power switching elements) and the potential for reduced catalyst durability due to repetitive start-up requirements severely limit the use of electrical pre-heat systems in association with most catalytic combustors.

Accordingly, a need exists in the fuel cell industry to develop low-cost and low-power pre-heat systems for use with catalyst-type combustors.

SUMMARY OF THE INVENTION

The present invention provides a combustor for a fuel processor which integrates a burner and a catalyst. The burner is utilized to quickly heat the catalyst to a light-off temperature to prepare it for normal operation. The heated catalyst is then used to react anode exhaust with air or cathode exhaust under normal operation.

DETAILED DESCRIPTION OF THE PREFERRED EMBODIMENTS

The present invention is generally related to a quick start combustor assembly for use in the fuel processor of a fuel cell system. In this regard, the invention will be described in the context of a fuel cell system fueled by reformed methanol (MeOH). However, it is to be understood that the principles embodied herein are equally applicable to fuel cells fueled by other reformable fuels such as, for example, ethanol or gasoline.

Figure 1:
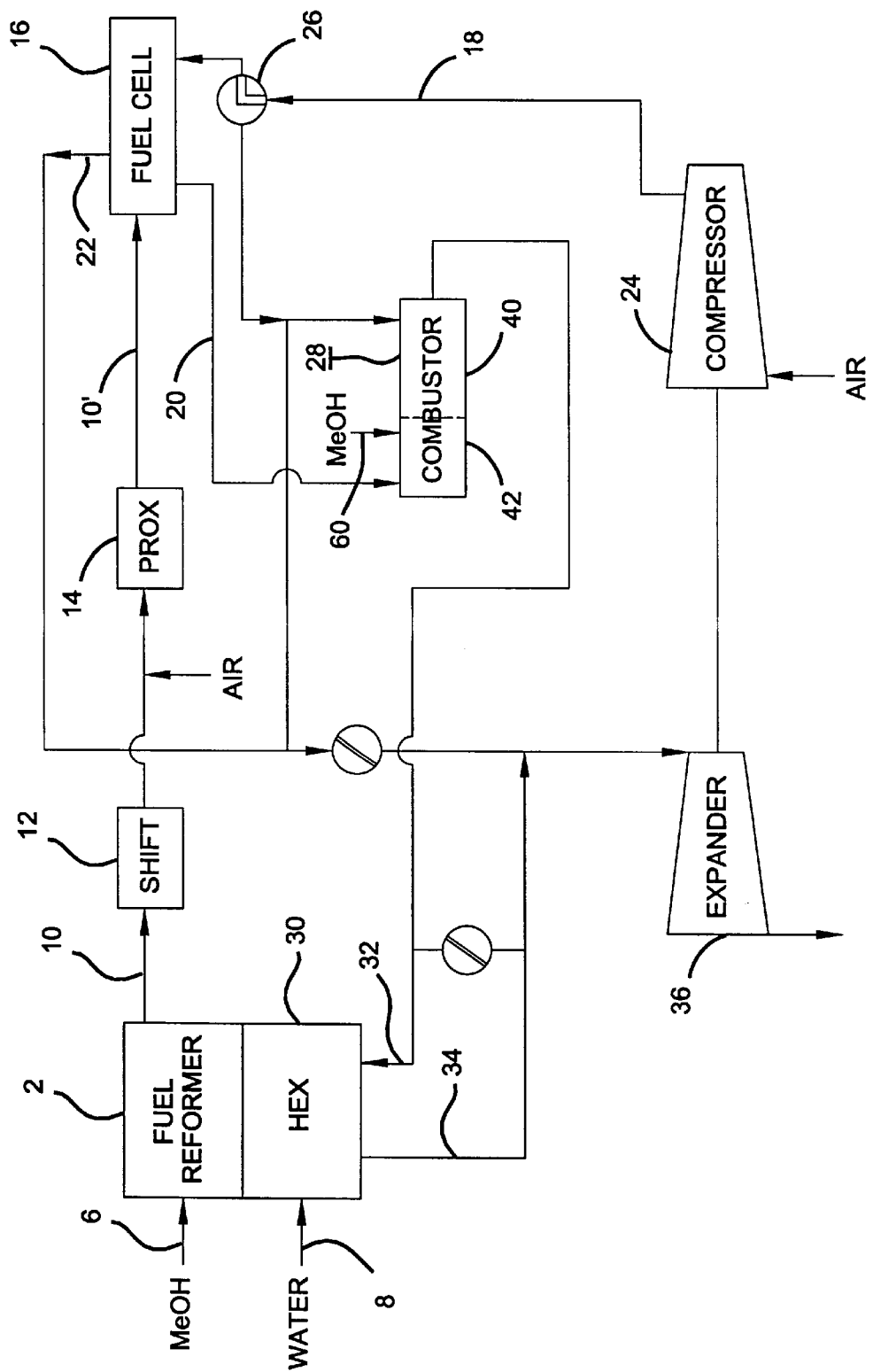
FIG. 1 is a schematic of a fuel cell system in accordance with the present invention.

FIG. 1 is a schematic of a fuel cell system including a reformer 2 for catalytically reacting methanol stream 6 and water from water stream 8 to form a hydrogen-rich reformate gas stream 10. The reformate output gas stream 10 comprises primarily $H_2$ and $CO_2$, but also includes CO and water. Nitrogen is also present in the case of an auto thermal reformer where air is added to such reformer. Reformate stream 10 passes through a shift reactor 12, and a preferential oxidation (PROX) reactor 14, as are well known in the art, to reduce the CO-levels therein to acceptable levels (i.e., below 20 ppm). The low CO reformate 10' is then fed into the anode chamber of fuel cell 16. The hydrogen from reformate stream 10' and the oxygen from oxidant stream 18 react in fuel cell 16 to produce electricity. Exhaust or effluent 20 from the anode side of fuel cell 16 contains some unreacted hydrogen. The exhaust or effluent 22 from the cathode side of fuel cell 16 contains some unreacted oxygen.

Air for oxidant stream 18 is provided by a compressor 24 and is directed to fuel cell 16 by a valve 26 under normal operating conditions. During startup, however, valve 26 is rotated to provide air to the input of a combustor 28 used to heat reformer 2, as will be described in more detail hereinafter.

Reformer 2 is associated with a heat exchanger (HEX) 30 such that heat from heat exchanger 30 heats the catalyst bed in reformer 2. In this regard, the $H_2O$—MeOH mixture inputted to reformer will be vaporized and preferably be recirculated/refluxed several times through both the catalyst bed in reformer 2 and heat exchanger 30 such that the mixture also functions as a heat transfer medium for carrying heat from exchanger 30 into the catalyst bed of reformer 2. Heat exchanger 30 itself is heated from exhaust gases 32 exiting the catalytic combustor 28. Gases 34 exiting heat exchanger 30 are still hot and pass through an expander 36 when reformer 2 does not require as much heat.

The combustor 28 for the fuel processor includes a burner 40 and a catalyst 42 integrated with the burner 40. A flame is initiated in the burner 40 for start-up. Air flows across the backside of the burner 40 where it is heated and then flows through the catalyst 42 in order to heat the catalyst above its light-off temperature to prepare it for normal operation. The burner 40 is provided with liquid or gaseous fuel for start-up. The catalyst 42 is used to react the anode exhaust 20 with air or cathode exhaust 22 under normal operation.

Figure 2:
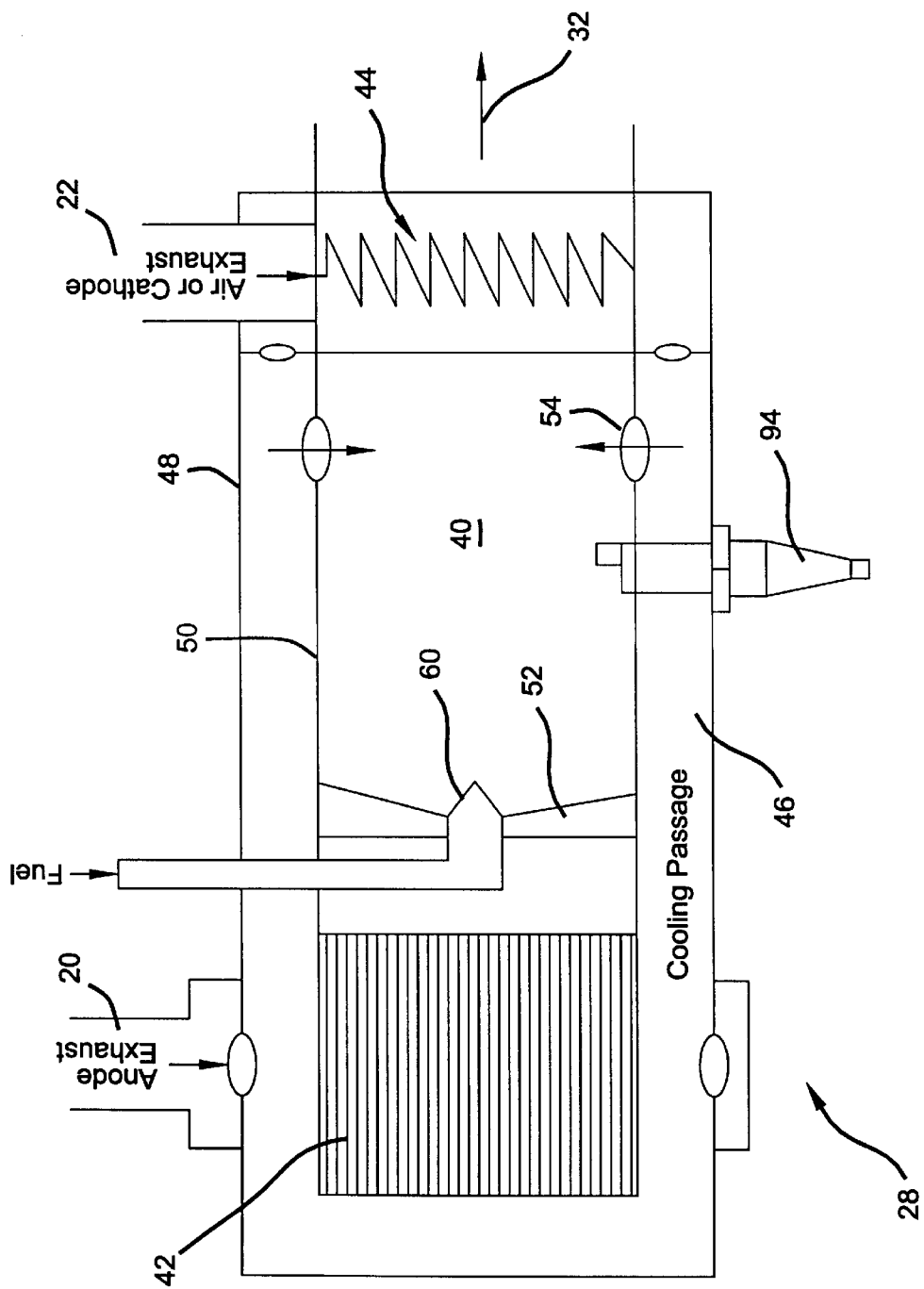
FIG. 2 is a sectional view of a dual mode single stage combustor according to a preferred embodiment of the present invention.

FIG. 2 shows an axial arrangement of the catalyst 42 and burner 40. Air or cathode exhaust 22 is supplied to the combustor 28 through a heat exchanger 44 and then flows along an annular cooling passage 46 which is defined between an outer housing 48 and an interior liner 50. The heated air/cathode exhaust is then directed through the catalyst 42 and a flame holder 52 and into the burner 40. When the burner 40 is operating, the air or cathode exhaust is heated by the heat exchanger 44 and by the liner 50 in the cooling passage 46. This flow then heats the catalyst 42 to above its light-off temperature to prepare the catalyst 42 for normal operation. A portion of the air or cathode exhaust 22 can be split from the cooling passage 46 as cooling air 54 to reduce the gas temperature as needed before passing through the heat exchanger 44. The introduction of air or cathode exhaust at 54 limits the temperature that the heat exchanger 44 is exposed to. The flow then passes out the exhaust 32 into the heat exchanger 30 or into other components. Start fuel is introduced to the burner through the fuel injector 60 downstream of a catalyst 42. For normal operation, the anode exhaust 20 is added to the air or cathode exhaust 22 and mixes in the cooling passage 46. This mixture then reacts in the catalyst 42. The heat exchanger 44 is then used to preheat the air/cathode exhaust to elevate the reaction temperatures in the catalyst 42 to increase reaction rates and conversion (particularly for $CH_4$ in the anode exhaust). It should be noted that the configuration of FIG. 2 can also be used without the heat exchanger 44 and the introduction of cooling air 54.

Figure 3:
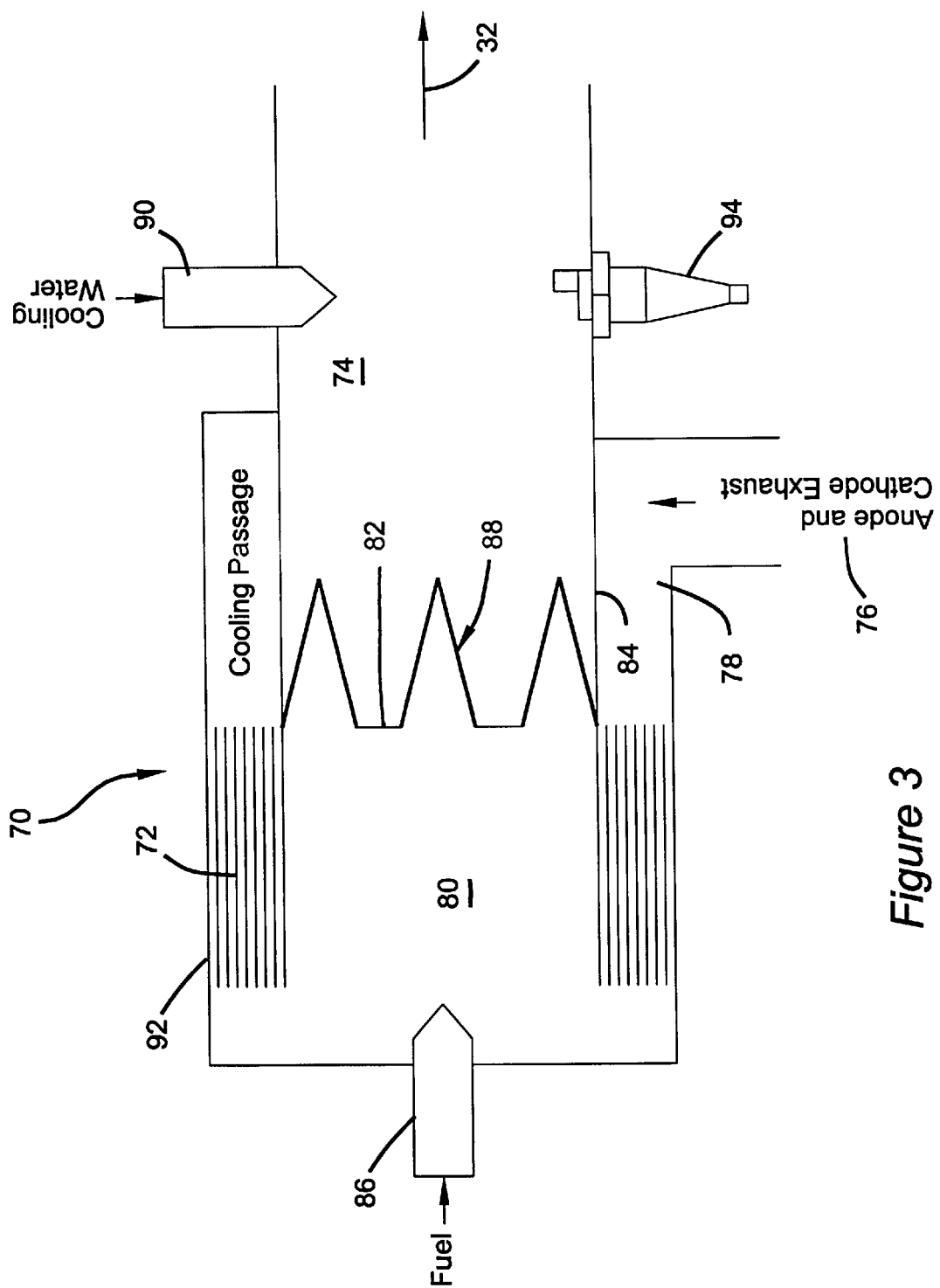
FIG. 3 is a sectional view of a dual mode multi-stage combustor according to an alternative preferred embodiment of the present invention.

FIG. 3 shows an alternative annular combustor 70 configuration wherein the catalyst 72 generally circumscribes the burner section 74. In this configuration, the anode and cathode exhaust 20, 22 are combined before the combustor and introduced through a common inlet port 76. During start-up, the mixture of anode and cathode exhaust would typically be air. Then, when the catalyst 72 is heated to its light-off temperature, the anode exhaust (with its associated $H_2$ content) would also be fed to this line to be reacted in the combustor 70. The anode and cathode exhaust flows along an annular cooling passage 78 and through the catalyst 72 into a mixing volume chamber 80. From the mixing volume chamber 80, the mixture flows across the flame holder 82 and into the burner section 74. During start-up, when the burner section 74 is operating, the air is heated across liner 84 in the cooling passage 78. This flow then heats the catalyst 72 to above its light-off temperature to prepare the catalyst 72 for normal operation. The flow then passes out the exhaust 32 for heat integration into the heat exchanger 30 or other components of the system. Start fuel is delivered through a fuel injector 86 downstream of the catalyst 72. For pre-mixed operation, the start fuel is injected into the mixing volume chamber 80 where it mixes with the air before passing through the flame holder 82. For diffusion operation, there would be no mixing volume chamber 80, and start fuel would be injected downstream of the flame holder 82 and directly into the flame 88. The flame holder 82 could be of any conventional type, such as a swirler, perforated plate (as shown in FIG. 3), backward facing step, bluff body, or transverse jets.

For normal operation, the anode and cathode exhaust introduced at input 76 reacts in the catalyst 72. Cooling water can also be injected at 90 which is used to reduce downstream temperatures. A heat exchanger can also be integrated into the configuration as shown in FIG. 2. For both configurations, the flow through the annular cooling passage 46, 78, in addition to heating the catalyst 42, 72, also serves to cool the liner 50, 84 from the high temperature flame in the burner 40, 74. It is preferable that this annular passage 46, 78 be narrow (typically ⅛ to ⅜ inch high) to have sufficiently vigorous heat transfer from the liner 50, 84, to the flow in the cooling passage 46, 78 to adequately cool the liner 50, 84 and heat the catalyst 42, 72. This cooling passage 46, 78 further serves as an insulating layer between the liner 50, 84 and the outer shell 48, 92 of the combustor 28, 70. If required for system thermal-balance, additional fuel can be added to the start fuel via fuel injector 60, 86 and reacted in the burner 40, 74 to provide a higher heat output.

The primary differences between the configurations shown in FIGS. 2 and 3 are the shape of the catalyst 42, 72 and the insertion of the fuel injectors 60, 86. For FIG. 2, the catalyst has a more simple construction being in the shape of a cylinder, typically a ceramic monolith. However, the fabrication to allow insertion of the fuel injector 60 is more difficult due to indirect access from the side and because the fuel line must pass through two walls 50, 48. For the annular configuration of FIG. 3, the catalyst 72 is constructed as an annulus (typically from brazed metal monolith that has been formed around the center diameter or where the center diameter has been cut from a cylindrical monolith. However, the fuel injector 86 is easily mounted to the front of the combustor 70 which would also facilitate maintenance of the fuel injector 86.

In operation, the start-up sequence includes starting the air or cathode exhaust flow 22 while energizing the spark plug 94 and establishing start fuel through injectors 60, 86. A flame is started in the burner 40, 74 and it is confirmed that the flame is stabilized in the burner 40, 74 by temperature measurement in the burner by a sensor (not shown). The flame within the burner 40, 74 heats the heat exchanger 44 as well as the liner 50, 84 which then warms the catalyst 42, 72. When the fuel processor is ready for normal operation, the catalyst temperature is above its light-off temperature and the start fuel provided through fuel injectors 60, 86 is shut off. The anode exhaust 20 is then initiated (or added to the anode and cathode exhaust port 76). The anode exhaust 20 and air/cathode exhaust 22 (or combined anode and cathode exhaust 76) react on the catalyst 42, 72.

The combustor arrangement 28, 70 of the present invention combines the features of both flame and catalyst combustion in a single combustor unit. The combustor integrally preheats the oxidant supply while rapidly providing heat to other reactors. The preheated oxidant stream passes through the catalyst zone before entering the final combustion zone resulting in catalyst bed preheat. The combustor configuration also requires no electrical preheat while avoiding severe catalyst bed thermal shock. By utilizing a gas phase (flame) burner at start-up, the combustor can rapidly provide heat to the fuel processor system for quick start-up. By integrating the combustor catalyst with a burner, as disclosed, the catalyst can be heated above the light-off temperature for normal operation without electric heat. Electrically heated catalysts require a large electric power input (typically 2–4 kilowatts at 12–24 volts and 160–240 amps) and the associated batteries and high current power switching to handle the large electric power input.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A combustor, comprising:
    a housing including at least one inlet port and an exhaust port for discharging exhaust gases;
    an interior liner defining a passage between said housing and said interior liner, said interior liner defining a burner section in communication with said exhaust port;
    a catalyst disposed in said housing in communication with said passage;
    a fuel delivery device disposed downstream of said catalyst for delivering fuel to said burner section; and
    a heat exchanger disposed downstream of said burner section, such that said exhaust gases flow through the heat exchanger.

2. The combustor according to claim 1, further comprising an ignition source disposed in said burner section.

3. The combustor according to claim 1, further comprising a flame holder disposed between said catalyst and said burner section.

4. The combustor according to claim 1, wherein said at least one inlet port communicates with said heat exchanger and inlet gases in said inlet port flow through said heat exchanger in a direction transverse to a flow path of said exhaust gases.

5. The combustor according to claim 4, wherein said at least one inlet port includes a first inlet port and a second inlet port spaced from said first inlet port.

6. The combustor according to claim 5, wherein said first inlet port is upstream from said heat exchanger and said second inlet port is downstream of said heat exchanger.

7. A combustor, comprising:
    a housing including at least one inlet port and an exhaust port for discharging exhaust gases;
    a catalyst disposed in said housing in communication with said at least one inlet port;
    a fuel delivery device disposed downstream of said catalyst for delivering fuel to a burner section, said inlet port communicating with a passage disposed adjacent to said burner section; and
    a heat exchanger disposed downstream of said burner section, such that said exhaust gases flow through the heat exchanger.

8. The combustor according to claim 7, further comprising an ignition source disposed in said burner section.

9. The combustor according to claim 7, further comprising a flame holder disposed between said catalyst and said burner section.

10. The combustor according to claim 7, wherein said at least one inlet port communicates with said heat exchanger.

11. The combustor according to claim 10, wherein said at least one inlet port includes a first inlet port and a second inlet port spaced from said first inlet port.

12. The combustor according to claim 11, wherein said first inlet port is upstream from said heat exchanger and said second inlet port is downstream of said heat exchanger.

13. A method for rapidly heating a catalyst for a fuel processing system during start-up, comprising the steps of:
    heating an oxidant gas using a burner section heated by a start fuel;
    passing the heated oxidant gas through a catalyst until a temperature of said catalyst reaches its light-off temperature; and
    mixing anode exhaust with said oxidant gas after said catalyst reaches said light-off temperature and passing said anode exhaust and oxidant gas mixture through said heated catalyst.

14. A fuel processor, comprising:
    a reactor system for dissociating hydrogen from hydrocarbon fuel and water;
    an integrated combustor and catalyst for providing heat to said reactor system, said integrated combustor and catalyst including a housing including at least one inlet port and an exhaust port, said catalyst being disposed in said housing in communication with said inlet port, a burner section being disposed in said housing in communication with said exhaust port, and a fuel delivery device disposed downstream of said catalyst for delivering fuel to said burner section, said burner section providing heat to gases passing through said inlet port to heat said catalyst, wherein said integrated combustor and catalyst provides heat to said reactor system.

15. A combustor comprising:
    a housing including an inlet port for supply of reactant and an exhaust port for discharging exhaust gases;
    a liner located at least partially within said housing, said liner and housing defining a passage through which said reactant flows, and a burner section in communication with said exhaust port;
    a catalyst disposed in said passage and circumscribing said liner; and
    a fuel delivery device arranged to deliver fuel for mixing with said reactant upstream of said burner section.

16. The combustor according to claim 15, further comprising an ignition source disposed in said burner section.

17. The combustor according to claim 15, further comprising a flame holder disposed between said catalyst and said burner section.

18. The combustor according to claim 15, further comprising a mixing volume chamber wherein said reactant and fuel are mixed, and a flame holder, said flame holder dividing said liner into said burner section and said mixing volume chamber.

19. The combustor according to claim 15, further comprising a mixing volume chamber, said fuel delivery device disposed within said mixing volume chamber.

20. The combustor according to claim 15, further comprising a water injector, wherein said water injector is disposed in said burner section.

* * * * *